United States Patent
Saint Requier et al.

(10) Patent No.: US 11,225,335 B2
(45) Date of Patent: Jan. 18, 2022

(54) AIRCRAFT OPERATIONAL STATE MONITORING SYSTEM AND RELATED METHOD

(71) Applicant: DASSAULT AVIATION, Paris (FR)

(72) Inventors: Cyril Saint Requier, Saint Cloud (FR);
Gilles Constant, Saint Cloud (FR);
Guy Schaller, Saint Cloud (FR);
Arnaud Branthomme, Saint Cloud (FR); Magali Thorel, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 204 days.

(21) Appl. No.: 16/508,268

(22) Filed: Jul. 10, 2019

(65) Prior Publication Data
US 2020/0017233 A1 Jan. 16, 2020

(30) Foreign Application Priority Data
Jul. 11, 2018 (FR) ...................................... 18 00733

(51) Int. Cl.
*B64D 45/00* (2006.01)
*G01C 23/00* (2006.01)
*G08G 5/00* (2006.01)

(52) U.S. Cl.
CPC ........... *B64D 45/00* (2013.01); *G08G 5/0021* (2013.01); *B64D 2045/007* (2013.01)

(58) Field of Classification Search
CPC .................................................... B64D 45/00
See application file for complete search history.

(56) References Cited

U.S. PATENT DOCUMENTS

| 2006/0155425 | A1* | 7/2006 | Howlett | G05D 1/0055 701/1 |
| 2017/0113810 | A1* | 4/2017 | Saptharishi | B64D 45/0005 |
| 2017/0129621 | A1* | 5/2017 | Flotte | B64D 45/00 |
| 2020/0410876 | A1* | 12/2020 | Gremmert | G08G 5/0047 |

FOREIGN PATENT DOCUMENTS

FR 2908384 A1 5/2008

* cited by examiner

*Primary Examiner* — Joseph H Feild
*Assistant Examiner* — Pameshanand Mahase
(74) *Attorney, Agent, or Firm* — Davidson, Davidson & Kappel, LLC

(57) ABSTRACT

An aircraft operational state monitoring system is provided that includes a module for acquiring a logic state of a plurality of components of the aircraft, the components belonging to airplane systems. The aircraft operational state monitoring system includes a module for determining the operability status of a plurality of macroscopic functions of the aircraft, each macroscopic function being defined independently of the components and airplane systems necessary for the performance of the macroscopic function, the operability status being determined based on logic states of the plurality of components between an operational status and at least one nonoperational status. The aircraft operational state monitoring system includes a display and at least one graphic display management assembly on the display, configured for displaying, on the display, summary indicators of the operability status of the macroscopic functions of the aircraft.

18 Claims, 7 Drawing Sheets

AIRCRAFT OPERATIONAL STATE MONITORING SYSTEM AND RELATED METHOD

The present invention relates to an aircraft operational state monitoring system, comprising:
a module for acquiring a logic state of a plurality of components of the aircraft, the components belonging to airplane systems.

Such a system is intended to be integrated into aircraft avionics, to assist the crew in determining the operational state of the functions of the aircraft, in particular during the flight of the aircraft.

BACKGROUND

In order to monitor and command the various systems of the aircraft, hereinafter referred to as "airplane systems", the usual avionics of aircraft provide several tools to the crew.

Block diagrams are provided to determine the status of the main airplane systems, for example fuel supply systems, engine systems, electrical systems. Each block diagram outlines the status of the components making up the associated airplane system and the measurements done on the components to determine their status.

In case of failure, failure messages of the crew alerting system (CAS) are displayed in a specific window.

Furthermore, another window can be displayed to provide the main operational limitations associated with the failures corresponding to the CAS messages.

The information provided to the crew is therefore very dispersed and not very functional. This can cause a significant workload in case of complex failures.

In particular, when a piece of equipment is faulty, this can have an impact on various functions of the aircraft. Indeed, in current aircraft architectures, the functions of the aircraft are projected on several airplane systems, each airplane system being able to use shared components. The impact of a failure occurring on a specific component can therefore cause multiple failures to be addressed.

This is the case for example for a failure occurring on the GPS system, which can cause multiple problems, for example in the navigation, the approaches, the measurement of the current position, etc.

In case of failure of the component, the crew can therefore have difficulties in easily and quickly identifying all of the functions that will be affected by the failure. To reconstitute the functional state of the aircraft, the crew bases itself on the displayed CAS messages, the block diagrams and the operational documentation Thus, when a CAS message appears, the crew applies the associated procedure, runs through the various system block diagrams to try to identify the consequences on the general operation of the aircraft and refers to the operational documentation generally listing the functions lost upon system failure.

Reconstituting the overall functional state of the aircraft can therefore prove time-consuming for the crew, which relies in part on its experience and the logical deductions it can make, sometimes under stressful conditions.

This can lead to difficulties in understanding the overall status of the airplane and to a failure to anticipate operational impacts and effects of a later deterioration.

SUMMARY OF THE INVENTION

A system for monitoring an aircraft operational state is provided, which simply and safely provides the crew with an overview of the remaining functional capabilities of the aircraft during a failure or equipment defect, while reducing the workload of the crew.

The system of the aforementioned type includes:
a module for determining the operability status of a plurality of macroscopic functions of the aircraft, each macroscopic function being defined independently of the components and airplane systems necessary for the performance of the macroscopic function, the operability status being determined based on logic states of the plurality of components between an operational status and at least one nonoperational status;
a display and at least one graphic display management assembly on the display, configured for displaying, on the display, summary indicators of the operability status of the macroscopic functions of the aircraft.

The system according to the invention may comprise one or more of the following features, considered alone or according to any technically possible combination:
each summary indicator of the operability status of one or several macroscopic functions of the aircraft summarizes the operability status of the group of functional services of the aircraft associated with the macroscopic function;
each summary indicator is configured to be developed by selection by a user, to show the operability status of each functional service of the aircraft associated with the macroscopic function;
the macroscopic functions are chosen from among a macroscopic flight function, a macroscopic navigation function, a macroscopic communication function, a macroscopic surveillance function, a macroscopic comfort function, a macroscopic crew monitoring function, a macroscopic servicing function, a macroscopic maintenance function, and a macroscopic start and stop function;
each summary indicator of the operability status of one or several macroscopic functions of the aircraft is configured to be displayed in a first configuration, in particular in a first color, in the operational status and to be displayed in at least one second configuration, in particular in a second color, in the nonoperational status;
the module for determining the operability status comprises a determination table identifying, from a logic status of each component of the plurality of components, the operability statuses of each macroscopic function of the aircraft;
the determination table comprises a dependency matrix establishing a dependency between at least one supplier system, in particular an electrical system, the components, and functional services associated with each macroscopic function, the module for determining the operability status being configured to identify, from logic states read by the acquisition module, by using the dependency matrix, the affected macroscopic functions and/or deterioration levels of the affected macroscopic functions, following a failure and/or a defect detected on at least one component of the aircraft.
the dependency matrix is established by identifying all of the functional services offered in the aircraft, by breaking down functional services into functional chains implementing lower level functions able to be projected on the components making up the physical architecture of the aircraft, and for each of the functional services, by development from the functional chain of the list of components contributing to the functional chain and their level of involvement in the functional chain, and for each of the components making up the physical architecture of the aircraft, by development of the list of functional services to which they contribute;

the graphic display management assembly is configured to display, in addition to indicators summarizing the operability status of one or several macroscopic functions of the aircraft, a summary block diagram of the operating status of the airplane systems comprising a plurality of airplane systems operating status indicators;

each operating status indicator of an airplane system is configured to be developed by selection by a user to show a command and surveillance block diagram of the airplane system;

said system according to the aforementioned type includes a module for determining an overall system status of the aircraft calculated from the operability status of the plurality of macroscopic functions of the aircraft, the graphic display management assembly being configured to display the overall status synthesis indicator of the aircraft based on the overall system status of the aircraft calculated by the module for determining the overall system status;

the synthesis indicator includes a first region representative of the overall system status of the aircraft, and a second region representative of the safety margin associated with the overall system status of the aircraft;

said system according to the aforementioned type includes a module for calculating operational limitations based on logic statuses of the plurality of components acquired by the acquisition module, the graphic display management assembly being configured to display a synthesis window displaying at least one information item chosen from the list of failures, the list of limitations, and a list of possible flight parameters taking account of the operational limitations; and said system according to the aforementioned type includes a module for determining operating statuses of energy flows, the graphic display management assembly being configured to display at least one operating status indicator of the energy flows calculated using the module for determining operating statuses of the energy flows.

A method for monitoring an operating status of an aircraft is also provided comprising the following steps:

providing a system as defined above;

acquiring, via the acquisition module, a logic state of a plurality of components of the aircraft;

determining, via the module for determining the operability status, the operability status of a plurality of macroscopic functions of the aircraft, between an operational status and at least one nonoperational status; and displaying, via the display management assembly on the display, summary indicators of the operability status of one or several macroscopic functions of the aircraft.

BRIEF SUMMARY OF THE DRAWINGS

The invention will be better understood upon reading the following description, provided solely as an example, and in reference to the appended drawings, in which.

DETAILED DESCRIPTION

In the figures, the display screens are illustrative of actual aircraft systems, and are therefore in English, in accordance with the standard display in the aeronautics field.

Figure 1:
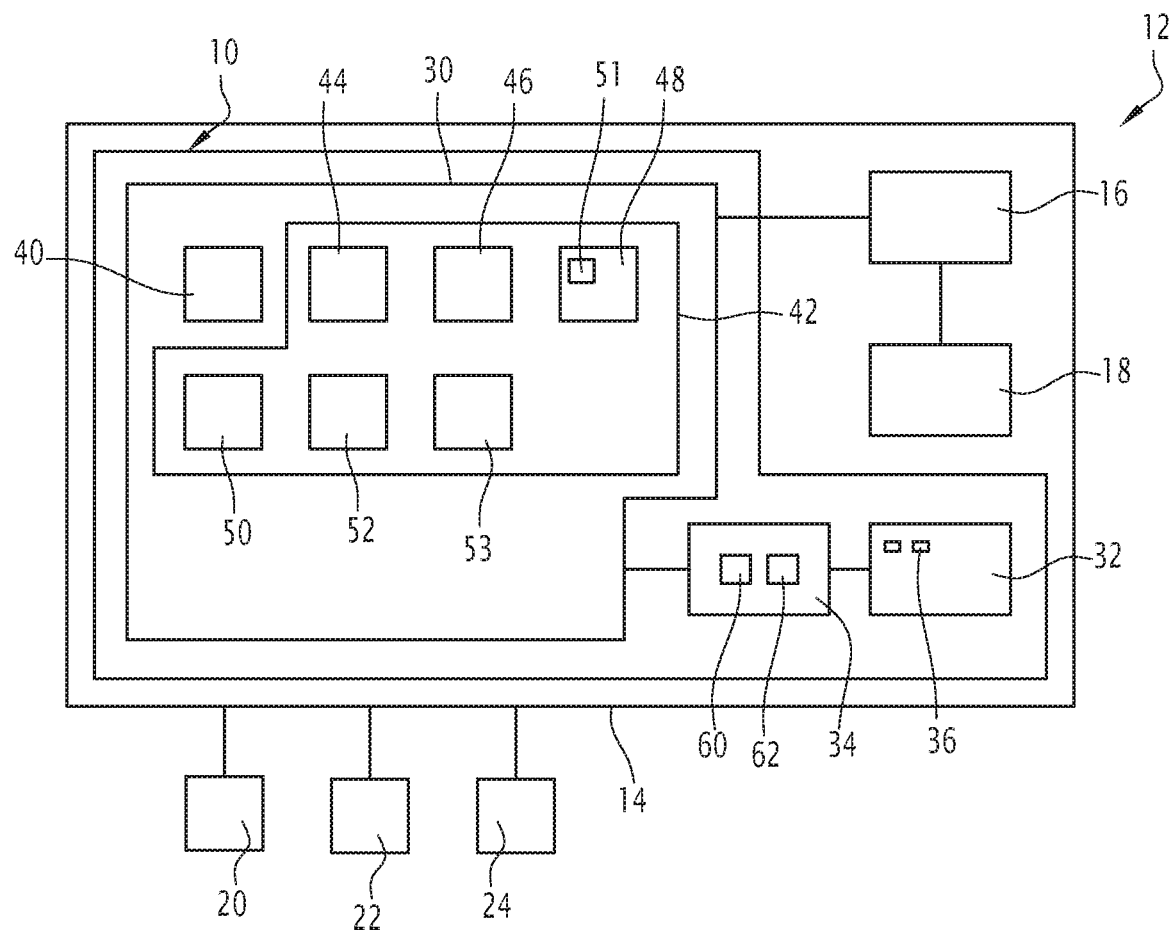
FIG. 1 is a block diagram of an aircraft operating status monitoring system according to an embodiment of the invention.
Figure 2:
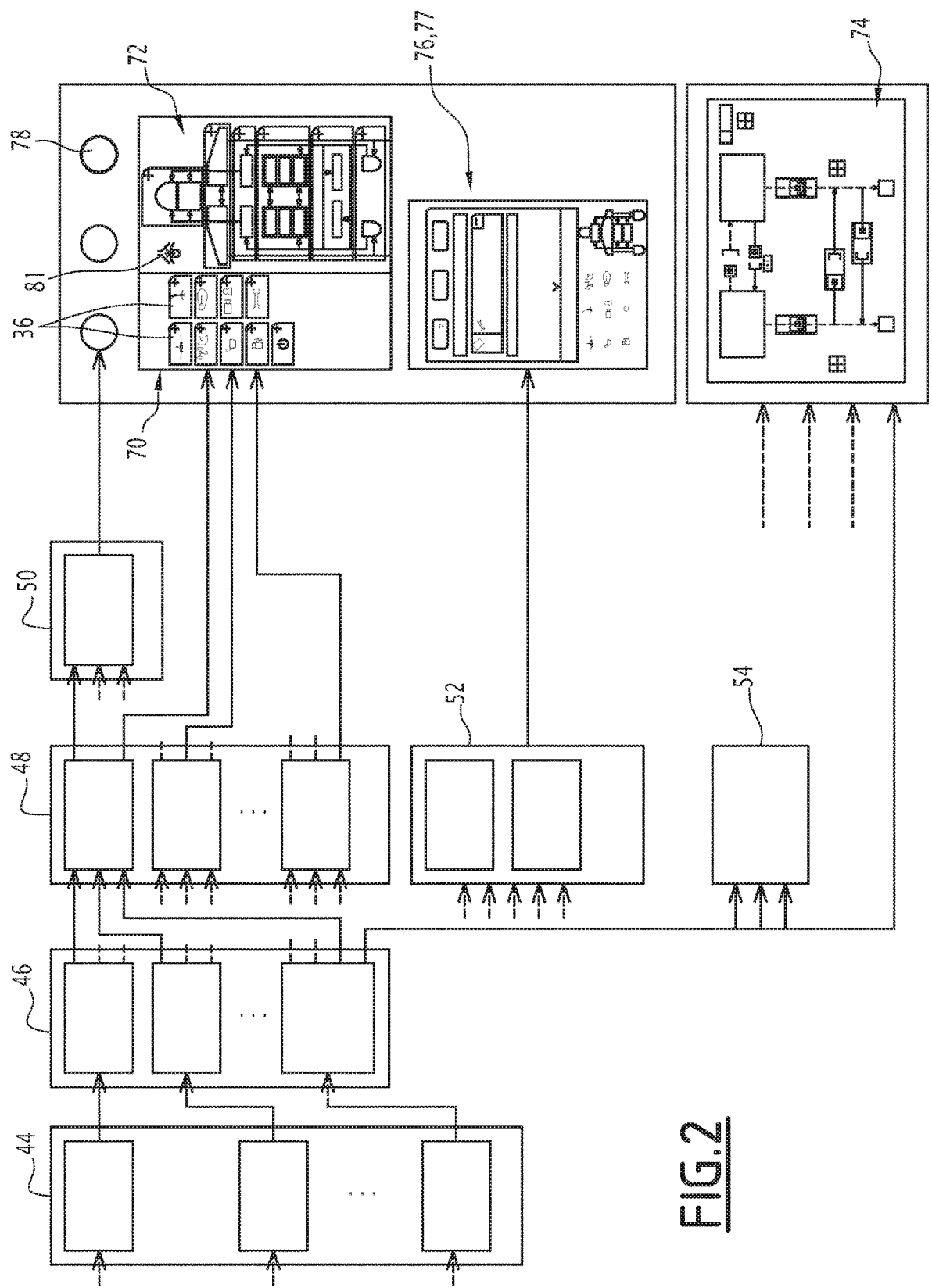
FIG. 2 is a diagram illustrating the relationships between the various modules of the system of FIG. 1.

A first system 10 for monitoring an operating status of an aircraft 12 according to an embodiment of the invention is illustrated by FIG. 1.

The system 10 is intended to be integrated into a central avionics system 14 including a central avionics unit 16 and at least one display unit 18 placed in the cockpit of the aircraft 12.

The cockpit of the aircraft 12 is for example located in the aircraft 12 itself, or in a control room remote from the aircraft 12.

The central avionics unit 16 is in particular connected to equipment of the aircraft 12, hereinafter referred to as "components". The components are intended to interact within airplane systems.

The airplane systems for example include measuring systems 20 of the aircraft, outside communication systems 22, and actuating systems 24 for controls of the aircraft.

The measuring systems 20 for example include components comprising sensors for measuring parameters outside the aircraft, such as the temperature, pressure or speed, sensors for measuring parameters inside the aircraft and at its various systems, and positioning sensors, such as GPS sensors, inertial units, and/or an altimeter.

The outside communication systems 22 for example include components comprising radio systems, VOR/LOC, ADF, DME, ILS systems, radar systems, and/or satellite communication systems such as "SATCOM".

The control systems 24 include components comprising actuators configured to actuate orders of the aircraft, such as flaps, control surfaces, pumps, or mechanical, electric and/or hydraulic circuits, and software actuators configured to configure the avionics states of the aircraft.

The airplane systems also comprise energy management systems, for example an electrical system, a fuel management system, a propulsion system, and/or fluid transfer systems, for example a conditioning system, etc.

Other examples of airplane systems are a bleed air system (BAS), an environmental control system (ECS), a deicing system, a pressurization system, an auxiliary power unit (APU), an electrical system, for example for distribution or electrical energy generation, a RAM air turbine (RAT) or a cabling system, a fire detection system, a fuel transfer system, a hydraulic system, a propulsion system (for example an integrated power plant system or IPPS), a landing system, a lighting system, an oxygen management system, a water management system, a braking management system.

More generally, an airplane system is at once functional, software-based and physical. It provides functional services implemented owing to a software architecture projected on a physical architecture.

The various systems 20 to 24 are connected to the central avionics unit 14, for example digitally, by at least one data bus circulating on a network inside the aircraft.

Each component of the aircraft can be involved in several separate airplane systems, and even belong or contribute to two separate airplane systems.

The airplane systems of the aircraft 12 are configured to perform technical and/or operational functions by means of the components of which they are made up. In reference to FIG. 7, the functions performed by the airplane systems include low-level functions F1, . . . , FN, which can be projected directly on the components C1, . . . , CN making up the physical architecture of the aircraft 12.

The projectable functions F1, . . . , FN are able to cooperate with one another within functional chains CF that make it possible to perform a functional service SF offered to the crew.

All of the functional services SF contribute to performing macroscopic functions of the aircraft that include the flight function, the navigation function, the communication function, the surveillance function, the comfort function, the pilot monitoring function, the service function, the maintenance function, and the start and stop function of the aircraft 12.

Each macroscopic function is defined independently of the components and airplane systems necessary for its performance.

The macroscopic management function of the flight includes all of the functional services making it possible to monitor the aircraft and cause it to travel in a mass of air.

Examples of functional services associated with the flight management function comprise thrust management, airplane attitude management, speed management, automatic pilot management, guide mode management, protection management making it possible to stay within the flight envelope, maneuvering capacity management, approach capacity management.

The macroscopic navigation function includes all of the functional services making it possible to guide the aircraft in its flight environment, so that it follows a given route in terms of heading, altitude, speed, etc.

Examples of functional services associated with the navigation function comprise flight plan management, waypoint management, management of the associated constraints, SID/STAR management, location capacity management, automatic flight plan monitoring capacity management.

The macroscopic communication function includes all of the functional services making it possible to communicate inside the aircraft (between the cockpit and the cabin) and to be configured to communicate with the world outside the aircraft.

Examples of functional services associated with the communication function comprise resource management (radios, satellite, etc.), frequency management, the management of automatic broadcasting services for the airplane status vector, managing text exchange services with air traffic control, etc.

The macroscopic monitoring function includes all of the functional services allowing the aircraft to monitor the outside environment in which it travels.

Examples of functional services associated with the monitoring function comprise monitoring the position of the aircraft with respect to the terrain, monitoring the aircraft with respect to other aircraft, monitoring weather hazards with respect to the aircraft, etc.

The macroscopic comfort function includes all of the functional services making it possible to ensure, within the aircraft, the comfort of the occupants of the aircraft, in particular passenger and crew comfort.

Examples of functional services associated with the comfort function comprise management of the internal pressure of the aircraft, temperature management, air quality management, humidity management, management of the supply of electricity to the occupants of the aircraft, etc.

The macroscopic crew monitoring function includes all of the functional services making it possible to monitor pilot fatigue as well as their main physiological parameters (heart rate, body temperature, etc.).

Examples of functional services associated with the crew monitoring function comprise video surveillance, pulse surveillance, infrared surveillance, etc.

The macroscopic service function includes all of the functional services providing the ground services necessary to ensure the proper operation of the aircraft and the operational mission.

Examples of functional services associated with the service function comprise fuel management, water management, toilet emptying, meal management, etc.

The macroscopic maintenance function includes all of the functional services making it possible to monitor, address and repair the defects and failures that may occur on the various airplane components and systems.

Examples of functional services associated with the maintenance function comprise recording system statuses, analyzing system statuses, managing maintenance procedures, etc.

The macroscopic start and stop function of the aircraft includes all of the functional services making it possible to start and stop airplane components and systems.

Examples of functional services associated with the start and stop function comprise the implementation of motors, electric buses, the cabin entertainment system, etc.

Each component of the aircraft 12 is configured to switch between an operational state in which the component operates nominally and at least one nonoperational state, in which the component has a defect and/or a failure affecting the normal operation of the component.

The nonoperational state can comprise a downgraded operating status, in which the equipment remains controllable, and a lost operating status, in which the equipment can no longer be controlled.

Each component of the aircraft 12 is configured to provide directly, or indirectly by means of a sensor, at least one logic state representative of its operating status.

The monitoring system 10 includes a unit 30 for determining operability, here configured to determine the operability status of a plurality of macroscopic functions of the aircraft 12, a display 32, configured to be accessible to the crew of the aircraft, and a graphic display management assembly 34 on the display 32, configured to display, on the display 32, summary indicators 36 of the operability status of the plurality of macroscopic functions of the aircraft 12.

In this example, the unit 30 for determining operability includes at least a processor 40 and a memory 42 containing a plurality of software modules configured to be run by the processor 40.

The software modules included in the memory 42 include a module 44 for acquiring logic states of a plurality of components of the aircraft 12, and advantageously a module 46 for calculating states of the airplane systems, based on logic states acquired by the acquisition module 44.

The software modules included in the memory 42 further include a module 48 for determining the operability status of a plurality of macroscopic functions of the aircraft, from logic states acquired by the acquisition module 44 and/or statuses of the airplane systems 12, obtained from the calculated module 46, and a module 50 for determining an overall status of the aircraft 12.

Advantageously, the software modules included in the memory 42 also include a module 52 for calculating operational limitations resulting from failures and/or defects of the airplane systems 12, based on statuses of the airplane systems 12 determined by the calculating module 46, and advantageously a module 53 for determining operating statuses of the energy flows.

The acquisition module 44 is configured to communicate (for example by periodic querying or on request) with the various components of the aircraft, and/or with the sensors that monitor the various components of the aircraft, in order to determine, for a plurality of components of the aircraft 12, a logic status of the component, representative of its operating status between an operational status and at least one nonoperational status, as defined above.

Preferably, the acquisition by the acquisition module 44 is done continuously, i.e., a frequency generally greater than 1 Hz.

The calculating module 46 is configured, for each airplane system, to determine the operating status of at least part of the components of the airplane system, and/or the operating status of at least one function projectable on one or several components of the airplane system. It is for example configured to operate according to the principle described in U.S. Pub. No.: 2017/0183085 A1, which is hereby incorporated by reference herein.

The calculating module 46 for example includes a match table between the logic states acquired by the acquisition module 44, and the operating statuses of the components of the airplane system and/or functions projectable on one or several components of the airplane system.

The module for determining the operability status 48 is configured to determine an operability status of each macroscopic function of the aircraft from among the aforementioned macroscopic functions. The operability status is determined between an operational status and at least one nonoperational status of the macroscopic function.

The module for determining the operability status 48 includes at least one determination table 51 (see FIG. 8), identifying, from a logic state of each component measured by the acquisition module 44 and/or from a system status determined by the calculating module 46, the operability status of each macroscopic function of the aircraft 12.

Figures 7, 8:
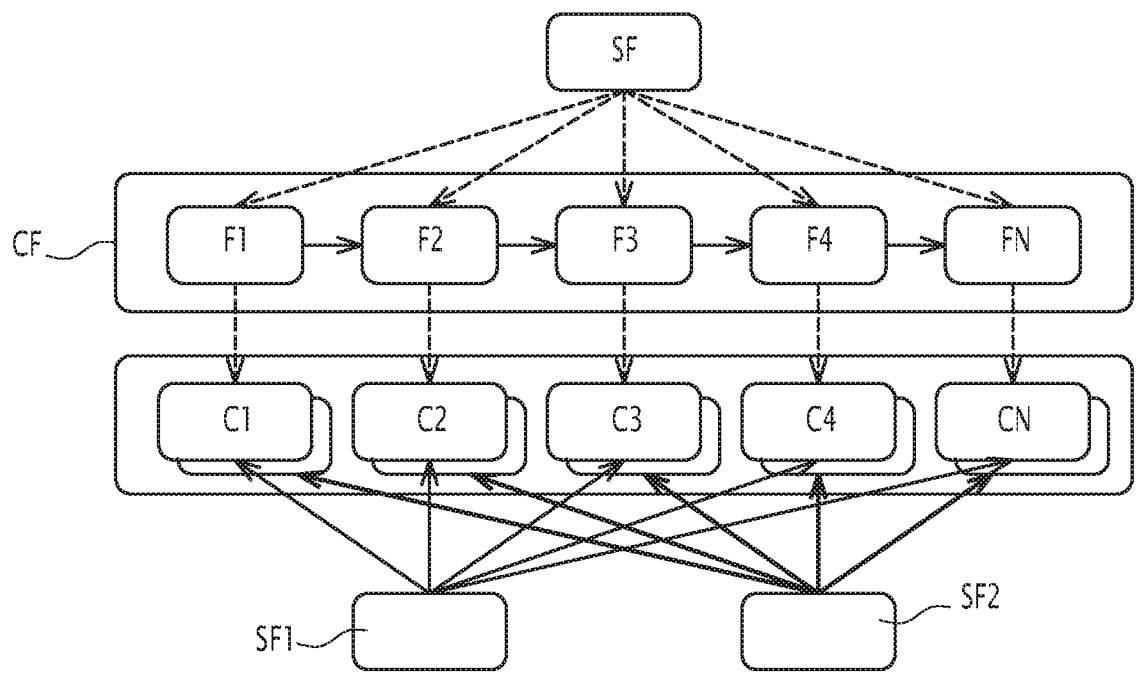
FIG. 7 is a view of a functional breakdown making it possible to develop the operational status of the aircraft.
FIG. 8 is a view of a dependency matrix of the database associated with the functional breakdown.

The table 51 comprises a dependency matrix shown schematically in FIG. 8. The table 51 establishes a dependency between at least one supplier system SF1, SF2 visible in FIG. 7, in particular an electrical system, the components C1, ..., CN, and the functional services SF included in each macroscopic function of the aircraft 12.

The module for determining the operability status 48 is thus configured to determine, from logic states obtained by the acquisition module 44, using the dependency matrix, the affected functional services SF, their deterioration level, and subsequently the operability status of each macroscopic function including at least one functional service.

The deterioration level is for example chosen between an active or inactive normal status, an active or inactive deteriorated status and an inactive lost status.

Preferably, the dependency matrix is established for each aircraft 12 by identifying all of the functional services SF offered to the crew, and more generally in the aircraft 12, by breaking down functional services SF into functional chains CF implementing lower level functions until obtaining functions F1, ..., FN able to be projected on the components C1, ..., CN making up the physical architecture of the aircraft 12.

The dependency matrix is established by determining, for each of the functional services SF, from the functional chain CF, the list of contributing components C1, ..., CN and their level of involvement, then, for each of the components C1, ..., CN of the aircraft 12, the list of functional services SF to which it contributes.

Preferably, the dependency matrix includes, for each of the components C1, ..., CN of the aircraft 12, its dependency on the supplier system SF1, SF2, and in particular on the electrical supply systems.

The module 50 for determining an overall status of the aircraft is configured to determine an overall system status of the aircraft, and advantageously, a safety margin associated with this overall system status of the aircraft.

Advantageously, the determining module 50 is configured to determine the overall status of the aircraft between an overall status without loss of airplane capacity, and an overall status having a loss of airplane capacity.

This determination is advantageously done by using the operability statuses of macroscopic functions determined by the determining module 48, using an overall status determination table, defining an overall status as a function of operability statuses of the functional services of the macroscopic functions of the aircraft 12.

The determining module 50 is configured to determine the safety margin associated with the overall status, based on a redundancy table of the functional services, between a satisfactory safety margin and a downgraded safety margin.

For example, if a functional service has a single redundancy, a failure on a functional service is indicated in the redundancy table as generating a downgraded safety margin.

The module for calculating operational limitations 52 is configured to determine a list of defects or failures affecting the aircraft 12, based on logic states obtained by the acquisition module 44, a list of limitations by flight phase as a function of the list of failures and/or defects present on the aircraft 12, in particular from a minimum equipment list database, and a usable flight envelope synthesis, for example including a maximum speed V max, a maximum altitude Alt max, a maximum Mach number M max, a maximum acceleration G max.

The module for determining operating statuses of the energy flows 53 is configured to determine the operating status of the energy flows, in particular of the electrical flows present in the aircraft 12. It is configured to establish the energy operating status between a normal operating status and a downgraded operating status.

The display 32 is for example a display of the cockpit of the aircraft 12, in particular the central display located between the seats of the pilots of the aircraft 12.

The graphic display management assembly 34 includes a processor 60 and a memory 62 containing at least one window display software module on the display 32, configured to be executed by the processor 60.

Figure 3:
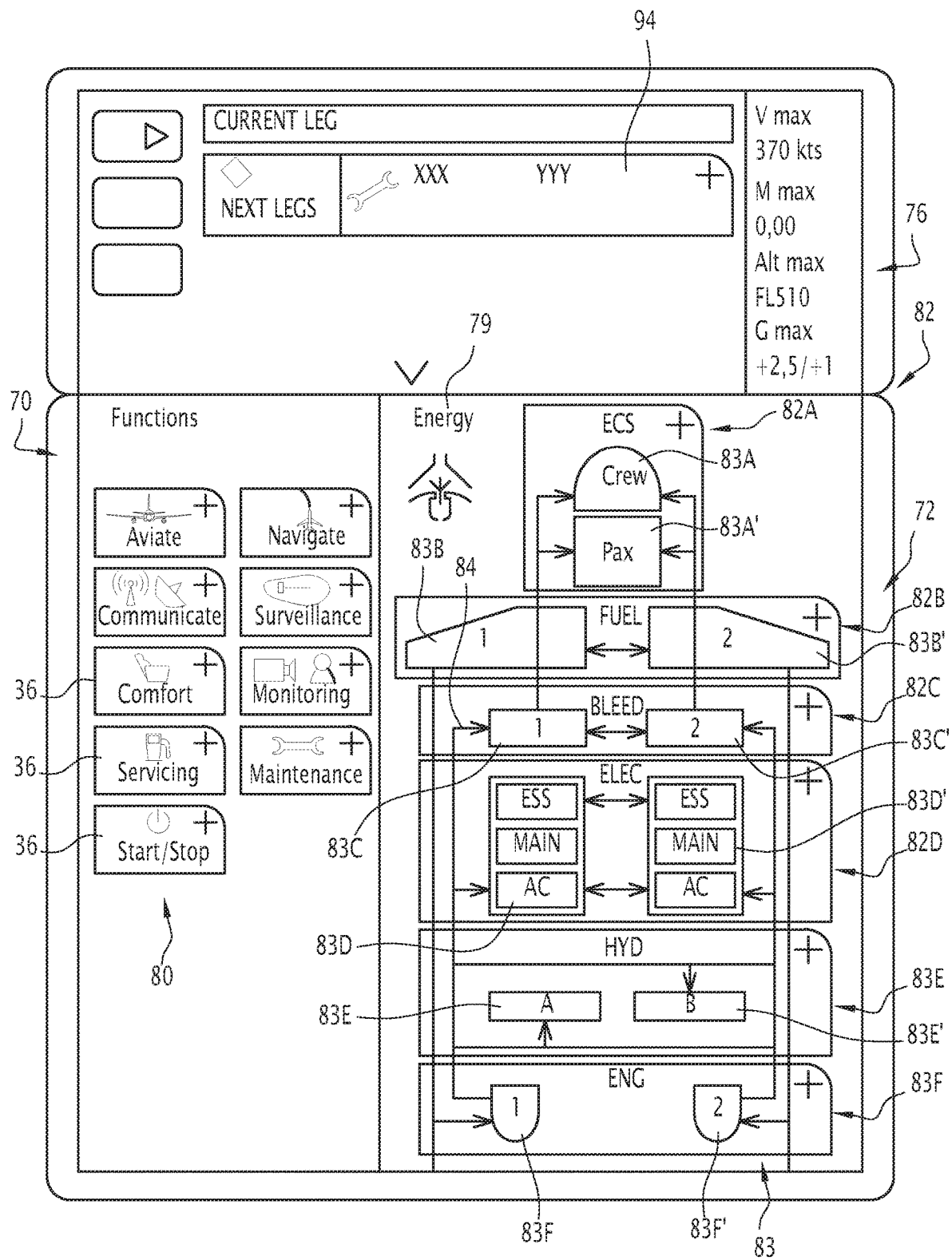
FIG. 3 is a view of a display of the monitoring system according to an embodiment of the invention, comprising a window for summary indicators of the operability status of macroscopic functions of the aircraft, and an interactive synthesis window for the operating status of the airplane systems.

As illustrated by FIG. 3, the graphic display management assembly 34 is thus configured to display at least one window 70 for summary indicators 36 of the operability status of the macroscopic functions of the aircraft 12.

It is advantageously configured to display an interactive synthesis window 72 of the airplane systems and access to block diagrams 74 corresponding to each airplane system.

Figure 4:
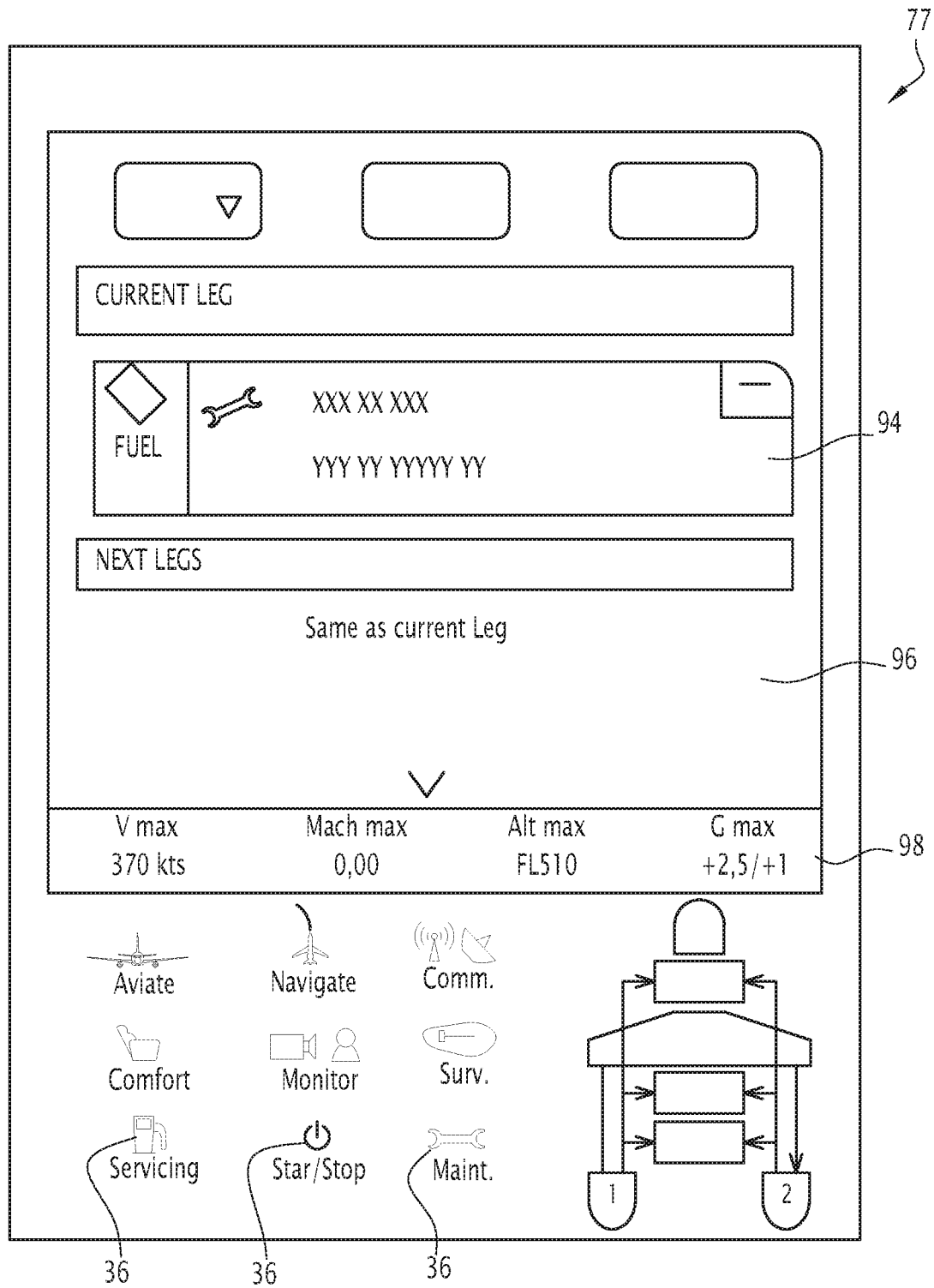
FIG. 4 is a view illustrating a synthesis window for operational limitations.

The graphic display management assembly 34 is further configured to display at least one synthesis window 76, 77 of lost functions and associated limitations (see FIGS. 3 and 4).

Figure 5:
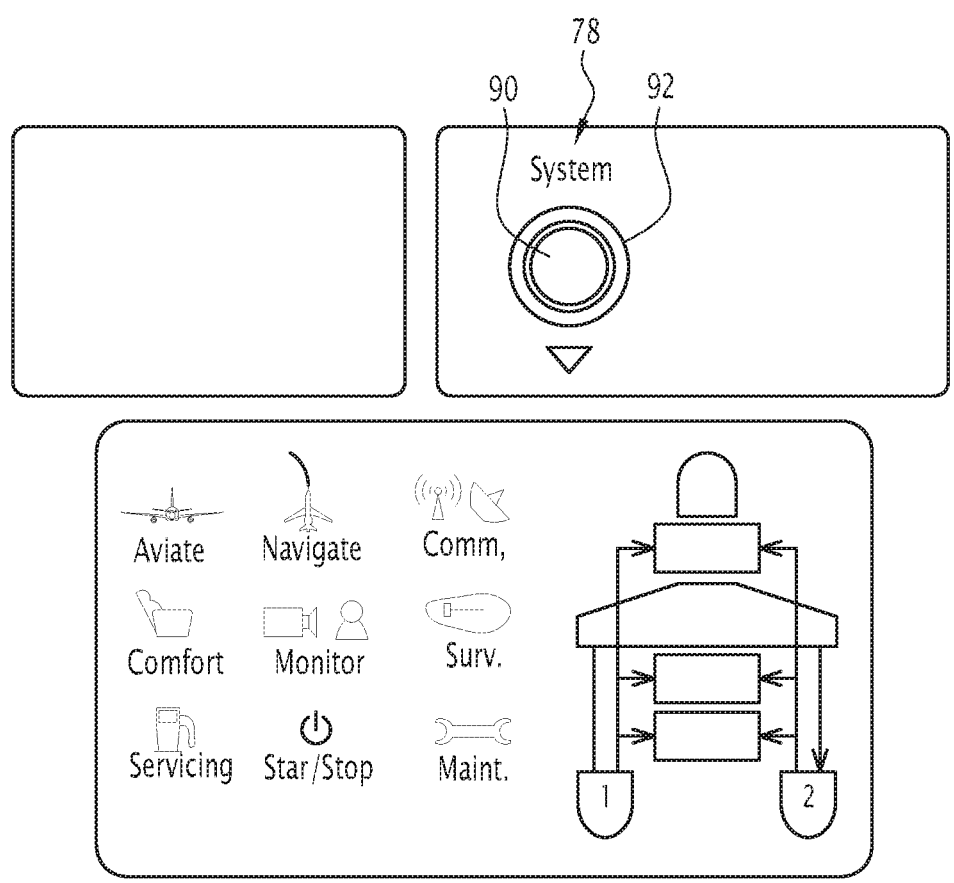
FIG. 5 is a view of an overall system status indicator.

In reference to FIG. 5, the graphic display management assembly 34 is also configured to display an overall status synthesis indicator 78 of the aircraft that here takes the form of a pellet, and advantageously, an indicator 79 presenting the status of energy flows, visible in FIG. 3.

The window 70 for indicators 36 has, for each macroscopic function of the aircraft, a summary indicator 36 of the operability status of the macroscopic function as determined by the module for determining the operability status 48.

In this example, the summary indicator 36 assumes the form of a button 80. The display of the summary indicator 36 is configured to be monitored by the graphic display management assembly 34, based on the operability status determined by the determination module 48, between a first configuration representative of the operational status of the macroscopic function and at least one second configuration representative of the nonoperational status of the macroscopic function.

For example, the first configuration corresponds to a first display color of the indicator 36, in particular a green color, while the second configuration corresponds to a second display color of the indicator 36, in particular an amber color.

The button 80 of each indicator 36 displayed on the window 70 is configured to be selected by the user. Upon selection by the user, the graphic display management assembly 34 is configured to develop a window corresponding to the macroscopic function, in order to show the operational status of the functional services associated with this macroscopic function.

The synthesis window 72 here is placed next to the indicator window 70. It includes regions 82 each representative of an airplane system, and links 84 between the regions 82. The synthesis window 72 is for example called "green board".

Each region 82 has at least one indicator 83 of the operation of an airplane system, advantageously an operation indicator 83 of at least one group of redundant components of the airplane system.

For example, at least one region 82A is representative of the conditioning systems and has an indicator 83A for the crew conditioning and an indicator 83A' for the passenger conditioning.

At least one region 82B is representative of the fuel distribution systems, and has an indicator 83B representative of a first distribution system and an indicator 83B' representative of a second distribution system.

At least one region 82C is representative of the air delivery systems, and includes an indicator 83C representative of a first air delivery system and an indicator 83C' representative of a second air delivery system.

At least one region 82D is representative of the electricity delivery systems, and includes an indicator 83D representative of a first electricity delivery system and an indicator 83D' representative of a second electricity delivery system.

At least one region 82E is representative of the hydraulic power delivery systems, and includes an indicator 83E representative of a first hydraulic power delivery system and an indicator 83E' representative of a second hydraulic power delivery system.

At least one region 82F is representative of the motor systems, and includes an indicator 83F representative of a first motor and an indicator 83F' representative of a second motor.

Figure 6:
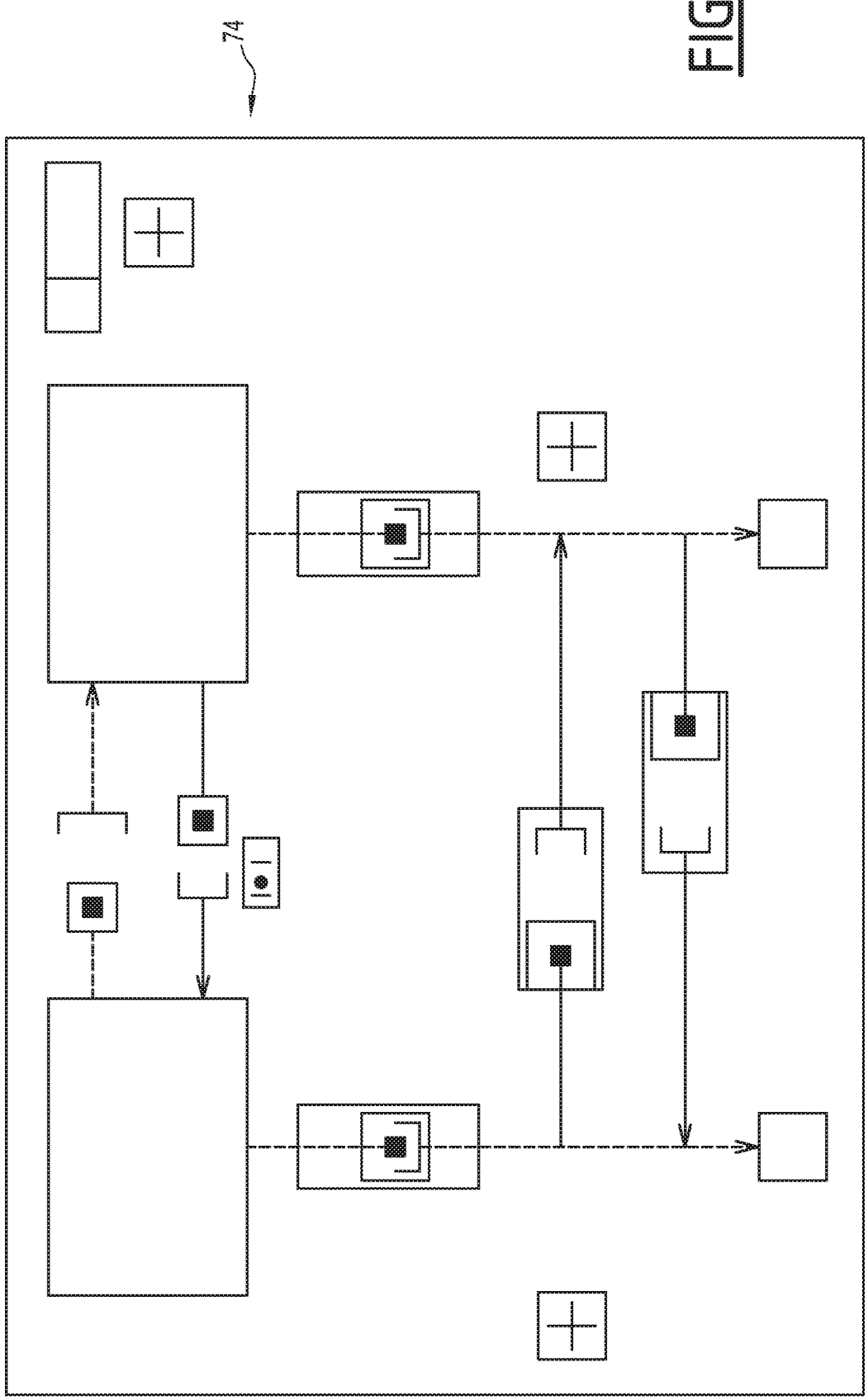
FIG. 6 is a view of an example block diagram of an airplane system, accessible from the synthesis window visible in FIG. 3.

Each region 82 is configured to be selected by the user to show a block diagram window 74 (see FIG. 6) corresponding to the components of the airplane system and the projectable functions corresponding to these components. An example block diagram 74 is described in U.S. Pub. No. 2017/0183085A1 by the Applicant.

Each operating indicator 83 is configured to be displayed in a first configuration, for example in a first color, when the operation of the airplane system, as determined by the calculating module 46, is an operational status. Each operating indicator 83 is configured to be displayed in a second configuration, for example in a second color, when the operation of the airplane system, as determined by the calculating module 46, is a nonoperational status.

Likewise, each link 84 is configured to be displayed in a first configuration, for example in a first color, when the operation of the link, as determined by the calculating module 46, is an operational status. Each link 84 is configured to be displayed in a second configuration, for example in a second color, when the operation of the link, as determined by the calculating module 46, is a nonoperational status.

As shown in FIG. 5, the synthesis indicator 78 here is in the form of a pellet comprising a first region 90 representative of the overall system status of the aircraft 12, determined by the determination module 50, and a second region 92 representative of the safety margin of the aircraft 12, determined by the determination module 50.

The first region 90 is for example a central region of the pellet. The second region 92 is for example a peripheral region of the pellet surrounding the first region 90.

The first region 90 is configured to be displayed in a first configuration, for example in a first color, when the overall system status of the aircraft 12 determined by the determination module 50 is an overall status with no loss of airplane capacity, and in a second configuration, for example in a second color, when the overall system status of the aircraft 12 determined by the determination module 50 is an overall status with loss of airplane capacity.

The second region 92 is configured to be displayed in a first configuration, for example in a first color, when the safety margin determined by the determination module 50 is a satisfactory safety margin, and to be displayed in a second configuration, for example in a second color, when the safety margin determined by the determination module 50 is a downgraded safety margin.

Thus, the crew can immediately have an indicator of the overall operating status of the aircraft, while anticipating any subsequent deteriorations.

Each synthesis window 76, 77 of the lost functions and associated limitations includes at least one strip 94 defining each lost function comprising an indication of the type of failures encountered. Each synthesis window 76, 77 includes information 96 on operational limitations for the subsequent flight phase and limitations 98 of the flight envelope.

At least one synthesis window 76 for lost functions, illustrated in FIG. 3, is displayed above indicator windows 70 and the synthesis window 72, and at least one synthesis window 77 for lost functions, illustrated in FIG. 4, is displayed independently on a display located opposite one of the pilots of the aircraft.

The operating indicator 79 for energy flows is configured to be displayed in a first configuration, for example a first color, when the operating status determined by the determination module 53 is a normal operating status, and to be displayed in a second configuration, for example a second color, when the operating status determined by the determination module 53 is a downgraded operating status.

The operation of the monitoring system 10 will now be described.

At each moment when the aircraft 12 is used, the acquisition module 44 reads the logic states associated with the plurality of components of the aircraft 12.

The logic states are sent to the calculating module 46. Based on the read logic states, and the match table, the calculating module 46 determines the operating status of the components of each airplane system 12, and optionally of projectable functions of the airplane system. The calculating module 46 then establishes, for each airplane system, whether the airplane system is in an operational state or a nonoperational state.

This information is sent to the graphic display management assembly 34, in order to enter the display configuration of the indicators 83 present in each region 82 of the synthesis window 72, and the display configuration of the links 84 between the regions 82.

Thus, when all of the airplane systems and all of the links are in an operational state, the set of indicators 83 present in each region 82 of the synthesis window 72 and the set of links 84 between the regions 82 is displayed in the first configuration.

When an airplane system and/or a link is in a nonoperational state, at least one indicator 83 present in a region 82 of the synthesis window 72, and/or at least one link 84, is displayed in a second configuration.

For example, in FIG. 3, a defect is read on the fuel transfer equipment between the first group of fuel tanks and the first engine of the aircraft. The link 84 between the region 82B and the region 82F is then displayed in the second configuration.

The crew can then select one or the other of the regions 82 in order to show a block diagram window 74 corresponding to this airplane system.

The logic states read by the acquisition module 44 are also sent to the module for determining the operability status 48. Using the determination table 51, the module for determining the operability status 48 determines the impacted functional services and their deterioration level, advantageously taking account of the dependency on the supplier system, and in particular the electrical system.

As a function of the affected functional services, the module for determining the operability status 48 determines the operability status of each macroscopic function as defined above, between an operational status and at least one nonoperational status.

This information is sent to the graphic display management assembly 34 in order to enter the configuration of each indicator 36 corresponding to a macroscopic function of the aircraft.

In particular, when the operability status of each macroscopic function of the aircraft is in an operational state, each indicator 36 of the indicator window 70 is displayed in the first configuration.

When the operability status of at least one macroscopic function is in a nonoperational state, the indicator 36 corresponding to this macroscopic function is displayed in the second configuration.

The crew then very quickly has overall information relative to the potentially faulty operational functions on the aircraft 12, without having to perform extensive searches from a failure and/or a defect of one or several specific components read by the acquisition module 44.

The crew may optionally select the indicator 36 to develop the functional services affected by the defect and/or the failure and to have more detailed information than the overall information.

At the same time, the operability status of each macroscopic function is sent to the module for determining the overall status 50. Using the match table, the determination module 50 defines an overall system status of the aircraft 12, between an overall status without loss of airplane capacity and an overall status with a loss of airplane capacity.

The determination module 50 also defines a safety margin associated with the overall status determined between a satisfactory safety margin and a downgraded safety margin.

This information is sent to the graphic display management assembly 34 to enter the configuration of the first region 90 of the synthesis indicator 78 and the second region 92 of the synthesis indicator 78, between the first configuration and the second configuration.

For example, in the case of a transmission problem between the first fuel tank and the first engine, the overall status of the aircraft 12 is first downgraded, displaying the first region 90 in the second configuration.

When the crew applies the procedure associated with this problem, a bypass is activated to supply the first engine of the aircraft 12 using the second fuel tank.

The overall status of the aircraft 12 no longer causes a loss of capacity, such that the first region 90 is displayed in the first configuration. Conversely, the safety margin is reduced, causing the display of the second region 92 of the synthesis indicator 78 in the second configuration.

The crew therefore has, in real time, overall information on the operability of the aircraft 12, and on the risks associated with other deteriorations that may occur in the aircraft 12. This allows it to anticipate possible future failures and the impact that these failures could have on the operability of the aircraft 12. This prevents the crew from being taken by surprise, if an additional failure occurs.

At the same time, the logic states are sent from the acquisition module 44 to the module for calculating operational limitations 52. Using the minimum equipment list table, the module for calculating operational limitations 52 determines the functional limitations by flight phase, the future limitations being able to occur during an upcoming flight, as well as the limitations of the flight envelope.

This information is displayed in at least one synthesis window 76, 77. The crew therefore has richer information than simple error messages, allowing it automatically to anticipate the present and future impact on the maneuverability of the aircraft and on the mission to be performed.

Owing to the system 10 and method described above, the crew is aware at all times of the existing and remaining capabilities of its aircraft, simply, and without having to perform detailed analyses from a defect or failure message.

The determination of the operability status of macroscopic functions of the aircraft 12, advantageously associated with the operability status of the airplane systems, allows the crew easily to link the logic downgrades observed on the components of the physical architecture of the aircraft with the impact on the macroscopic functions of the aircraft. This greatly improves safety and reduces the workload of the crew.

Likewise, the presence of a synthesis indicator 78 of the overall status, advantageously provided with a region 92 representative of the safety margin, allows the crew easily to anticipate the effects of a later downgrade, limiting the risk of surprise during a subsequent failure.

In a variant, the modules of the system 10 are each made in the form of a programmable logic component, such as an FPGA (Field Programmable Gate Array), or in the form of a dedicated integrated circuit, such as an ASIC (Application Specific Integrated Circuit).

What is claimed is:

1. An aircraft operational state monitoring system comprising:
    an acquisition unit configured to acquire a logic state of a plurality of components of the aircraft, the components belonging to aircraft systems;
    an operability status determining unit configured to determine an operability status of a plurality of macroscopic functions of the aircraft, each macroscopic function being defined independently of the components and of airplane systems necessary for the performance of the macroscopic function, the operability status being determined based on the logic states of the plurality of components between an operational status and at least one nonoperational status; and
    a display and at least one graphic display manager configured to display, on the display, summary indicators of the operability status of the macroscopic functions of the aircraft,
    wherein the operability status determining unit comprises a determination table identifying, from the logic state of each component of the plurality of components, the operability statuses of each macroscopic function of the aircraft.

2. The system according to claim 1, wherein each summary indicator of the operability status of one or several macroscopic functions of the aircraft summarizes the operability status of a group of functional services of the aircraft associated with the macroscopic function.

3. The system according to claim 1, wherein each summary indicator is configured to be developed by selection by a user, to show the operability status of each functional service of the aircraft associated with the macroscopic function.

4. The system according to claim 1, wherein the macroscopic functions are chosen from among a macroscopic flight function, a macroscopic navigation function, a macroscopic communication function, a macroscopic surveillance function, a macroscopic comfort function, a macroscopic crew monitoring function, a macroscopic servicing function, a macroscopic maintenance function, and a macroscopic start and stop function.

5. The system according to claim 1, wherein each summary indicator of the operability status of one or several macroscopic functions of the aircraft is configured to be displayed in a first configuration in the operational status and to be displayed in at least one second configuration in the nonoperational status.

6. The system according to claim 1, wherein the determination table comprises a dependency matrix establishing a dependency between at least one supplier system, the components and functional services associated with each macroscopic function, the operability status determining unit being configured to identify, from the logic states read by the acquisition unit, by using the dependency matrix, the affected macroscopic functions and/or deterioration levels of the affected macroscopic functions, following a failure and/or a defect detected on at least one component of the aircraft.

7. The system according to claim 6, wherein the dependency matrix is established by identifying all of the functional services offered in the aircraft, by breaking down functional services into functional chains implementing lower level functions configured to be projected on the components making up a physical architecture of the aircraft, and
    for each of the functional services, by development from the functional chain of the list of components contributing to the functional chain and a level of involvement in the functional chain of the components contributing to the functional chain, and
    for each of the components making up the physical architecture of the aircraft, by development of the list of functional services to which the components making up the physical architecture contribute.

8. The system according to claim 1, wherein the graphic display manager is configured to display, in addition to summary indicators of the operability status of one or several macroscopic functions of the aircraft, a summary block diagram of the operating status of the airplane systems comprising a plurality of airplane systems operating status indicators.

9. The system according to claim 8, wherein each operating status indicator of each of the airplane systems is configured to be developed by selection by a user to show a command and surveillance block diagram of the airplane system.

10. The system according to claim 1, further comprising an overall system status determining unit configured to determine an overall system status of the aircraft calculated from the operability status of the plurality of macroscopic functions of the aircraft, the graphic display manager being configured to display an overall status synthesis indicator of the aircraft based on the overall system status of the aircraft calculated by the overall system status determining unit.

11. The system according to claim 10, wherein the overall synthesis indicator includes a first region representative of the overall system status of the aircraft, and a second region representative of a safety margin associated with the overall system status of the aircraft.

12. The system according to claim 1, further comprising an operational limitations calculator configured to calculate operational limitations based on the logic states of the plurality of components acquired by the acquisition unit, the graphic display manager being configured to display a synthesis window displaying at least one information item chosen from a list of failures, a list of limitations, and a list of possible flight parameters, the at least one information item taking account of the operational limitations.

13. The system according to claim 1, further comprising an energy flows operating statuses determining unit configured to determine operating statuses of energy flows, the graphic display manager being configured to display at least one operating status indicator of the energy flows calculated using the energy flows operating statuses determining unit.

14. An aircraft operational state monitoring method, comprising the following steps:
- providing the system according to claim 1;
- acquiring, via the acquisition unit, the logic state of the plurality of components of the aircraft;
- determining, via the operability status determining unit, the operability status of the plurality of macroscopic functions of the aircraft, between the operational status and at least one nonoperational status; and
- displaying, via the display manager, on the display, the summary indicators of the operability status of one or several macroscopic functions of the aircraft.

15. An aircraft operational state monitoring system comprising:
- an acquisition unit configured to acquire a logic state of a plurality of components of the aircraft, the components belonging to aircraft systems;
- an operability status determining unit configured to determine an operability status of a plurality of macroscopic functions of the aircraft, each macroscopic function being defined independently of the components and of airplane systems necessary for the performance of the macroscopic function, the operability status being determined based on the logic states of the plurality of components between an operational status and at least one nonoperational status;
- a display and at least one graphic display manager configured to display, on the display, summary indicators of the operability status of the macroscopic functions of the aircraft; and
- an overall system status determining unit configured to determine an overall system status of the aircraft calculated from the operability status of the plurality of macroscopic functions of the aircraft, the graphic display manager being configured to display an overall status synthesis indicator of the aircraft based on the overall system status of the aircraft calculated by the overall system status determining unit.

16. The system according to claim 15, wherein the overall synthesis indicator includes a first region representative of the overall system status of the aircraft, and a second region representative of a safety margin associated with the overall system status of the aircraft.

17. An aircraft operational state monitoring system comprising:
- an acquisition unit configured to acquire a logic state of a plurality of components of the aircraft, the components belonging to aircraft systems;
- an operability status determining unit configured to determine an operability status of a plurality of macroscopic functions of the aircraft, each macroscopic function being defined independently of the components and of airplane systems necessary for the performance of the macroscopic function, the operability status being determined based on the logic states of the plurality of components between an operational status and at least one nonoperational status;
- a display and at least one graphic display manager configured to display, on the display, summary indicators of the operability status of the macroscopic functions of the aircraft; and
- an operational limitations calculator configured to calculate operational limitations based on the logic states of the plurality of components acquired by the acquisition unit, the graphic display manager being configured to display a synthesis window displaying at least one information item chosen from a list of failures, a list of limitations, and a list of possible flight parameters, the at least one information item taking account of the operational limitations.

18. An aircraft operational state monitoring system comprising:
- an acquisition unit configured to acquire a logic state of a plurality of components of the aircraft, the components belonging to aircraft systems;
- an operability status determining unit configured to determine an operability status of a plurality of macroscopic functions of the aircraft, each macroscopic function being defined independently of the components and of airplane systems necessary for the performance of the macroscopic function, the operability status being determined based on the logic states of the plurality of components between an operational status and at least one nonoperational status;
- a display and at least one graphic display manager configured to display, on the display, summary indicators of the operability status of the macroscopic functions of the aircraft; and
- an energy flows operating statuses determining unit configured to determine operating statuses of energy flows, the graphic display manager being configured to display at least one operating status indicator of the energy flows calculated using the energy flows operating statuses determining unit.

\* \* \* \* \*